United States Patent [19]

Daum et al.

[11] Patent Number: 4,718,441

[45] Date of Patent: Jan. 12, 1988

[54] DECORATOR TIP CLEANING DEVICE

[76] Inventors: Harry C. Daum, 25512 Dana Mesa Dr., San Juan Capistrano, Calif. 92675; Marlene K. McKeown, 24671 Rollingwood Rd., El Toro, Calif. 92630

[21] Appl. No.: 889,910

[22] Filed: Jul. 28, 1986

[51] Int. Cl.$^4$ .............................................. B08B 3/00
[52] U.S. Cl. .............................. 134/201; 134/166 R; 134/170; 211/74; 211/71; D32/3
[58] Field of Search ............. 134/201, 166 R, 166 C, 134/170, DIG. 1; 211/74, 77, 78, 81, 70.1, 71, 168, 169.1; D32/2, 3, 55; 220/23.2, 23.4; 206/150

[56] References Cited

U.S. PATENT DOCUMENTS

| | | | |
|---|---|---|---|
| D. 165,610 | 1/1952 | Sandberg | D32/55 |
| 737,355 | 8/1903 | Cramer | 134/128 |
| 756,591 | 4/1904 | Cramer | 134/128 |
| 2,818,979 | 1/1958 | Rose | 134/166 R |
| 2,899,079 | 8/1959 | Davis | 211/74 |
| 2,970,700 | 2/1961 | Lacy et al. | 211/74 |
| 3,616,805 | 11/1971 | Marsee | 134/201 |
| 4,317,551 | 3/1982 | Bishop | 211/81 |

*Primary Examiner*—Henry J. Recla
*Assistant Examiner*—Renee S. Luebke
*Attorney, Agent, or Firm*—Francis X. LoJacono

[57] ABSTRACT

A decorator tip cleaning device includes a pair of planar sheets of heat resistant plastic material are hinged together at one corner and moveable with respect to each other between an overlying position and an open position. The sheets each define a plurality of apertures sized to receive a plurality of decorator tips. Once the tips are positioned within the apertures of one of the sheets, the other sheet is pivoted to the overlying position to captivate the tips between the sheets. The entire assembly is then placed into a dishwasher for cleaning.

7 Claims, 5 Drawing Figures

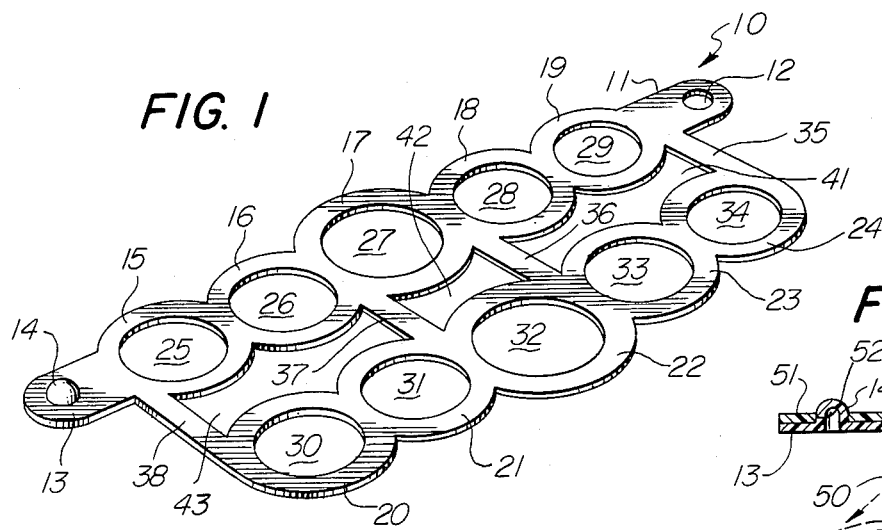
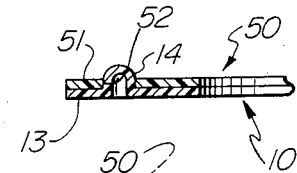
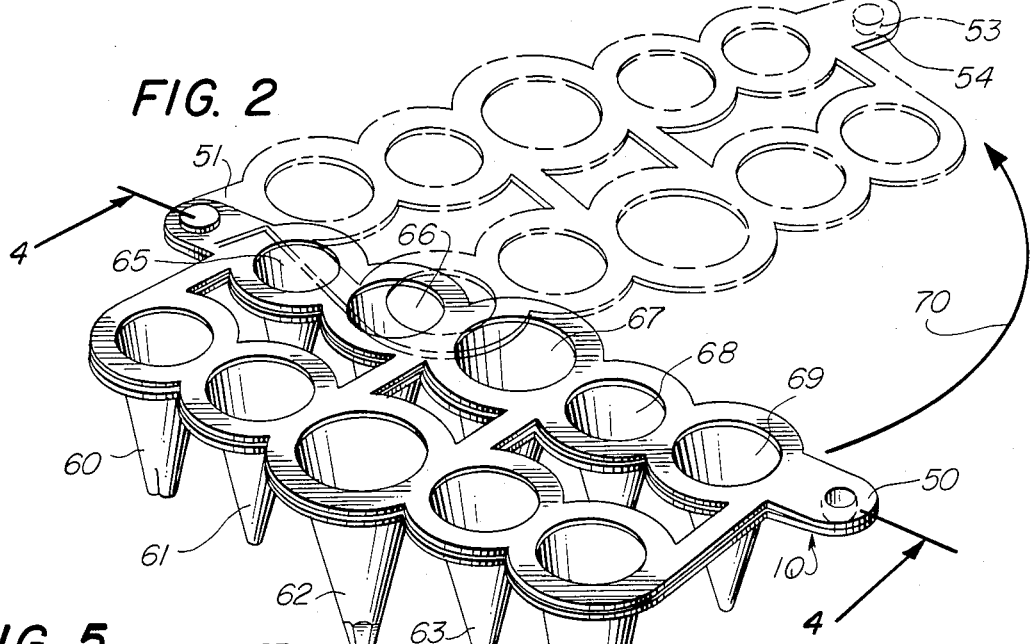
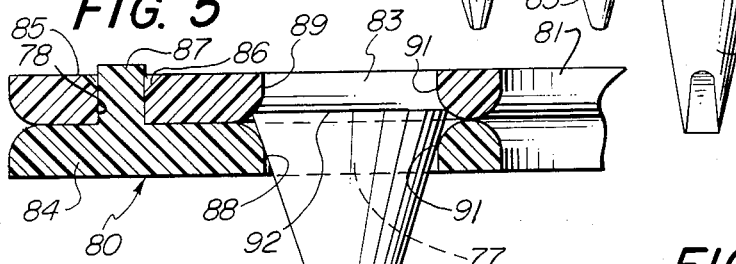
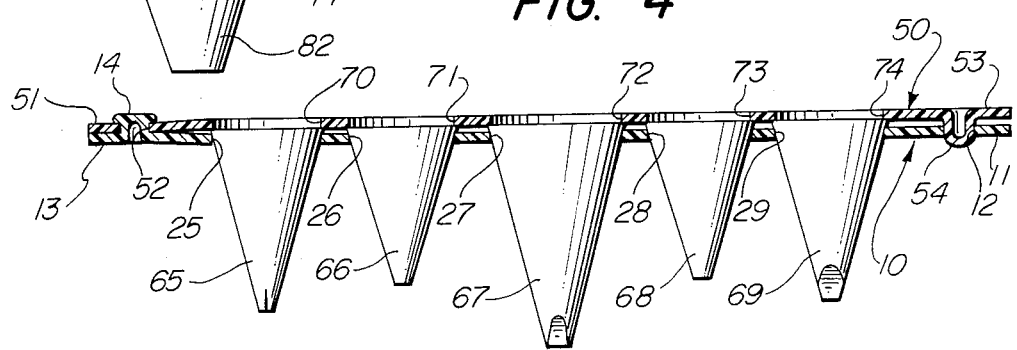

DECORATOR TIP CLEANING DEVICE

FIELD OF THE INVENTION

This invention relates generally to cleaning apparatus and particularly to apparatus utilized in cleaning the decorator tips used in pastry and cake decorating.

BACKGROUND OF THE INVENTION

A number of devices have been utilized through the years in the art of cake decoration in which additional layers of confectionary material, such as cake frosting, are formed into decorative patterns on the side and upper surfaces of cakes and pastries. In most instances, such decorations are formed of a special frosting-like material and are often configured in multi-colored and frequently intricate design patterns on the cake surface. Skilled cake decorators are able to produce decorations which vary from simple names or messages to colorful scene depictions and floral arrangements or other similar subject matter.

While a number of devices have been created for use in the cake decoration process, the most frequently used comprises a flexible bag-like member of cloth or the like which includes a lower portion having a reduced tapered cross-section and terminating in a relatively small orifice. The remainder of the cake decorating member is constructed much like a simple cloth bag. A decorator tip having a generally tapered configuration, usually a conic section or other similar shape, is sized to fit within the smaller orifice and extend therethrough. The tip defines a nozzle orifice having a shape which determines the cross-section of the frosting material passing through the decorating device.

In typical use, the decorator tip is positioned within the bag and a large amount of frosting material is then placed in the bag after which the upper larger opening is twisted closed and the bag is squeezed by the cake decorator to force the frosting or other decorating material out through the nozzle orifice of the decorating tip. In most situations, cake decorators utilize a large number of such decorating devices to accommodate different colors and sizes and shapes of squeezed out frosting material.

Because the frosting material and other cake decorating materials tend to harden, a problem arises in cleaning the decorator tips between uses. Because it is not unusual for a cake decorating facility to have several dozens of cake decorating tips requiring cleaning at the end of the day, manual cleaning of decorator tips is a time consuming process. In addition, the decorator tips having small discharge orifices often require special handling for effective cleaning.

As a result, there has arisen a need for an economical, efficient and reliable means of cleaning the decorator tips utilized in cake decorating. The attempts to provide efficient cleaning methods for decorator tips has been frustrated to some extent by the fragile structure of the tips themselves. While decorator tips have been formed of differing materials, the most frequently used comprise cone-like members formed of a thin sheet metal material. While such decorator tips function well in their intended use as decorating devices, they are difficult to clean due to the ease with which they can be bent or otherwise deformed by objects such as brushed or probes which are employed to clean the decorator tips. In addition, any use of scraping or abrasive cleaners further increases the chances of scratching, marring or otherwise damaging the decorator tips.

In an attempt to avoid such damage to the decorator tips, practioners in the art have developed mesh-like baskets which are filled with the decorator tips and placed in a conventional dishwasher. While some improvement is realized by this approach, the quality of cleaning action has not been found to be satisfactory. Often, the tips become banged around and damaged by the violent water action of the dishwasher.

There remains therefore, a need in the art for an efficient, effective and easy means of cleaning cake decorating tips which does not subject the tips to damage or deformation.

SUMMARY OF THE INVENTION

Accordingly, it is a general object of the present invention to provide an improved decorator tip cleaning device. It is a more particular object of the present invention to provide an improved decorator tip cleaning device which does not subject the decorator tips to the likelihood of damage during the cleaning process.

In accordance with the invention there is provided a decorator tip cleaning device in which a pair of planar sheets of heat resistant plastic material are hinged together at one corner and movable with respect to each other between an overlying position and an open position. The sheets each define a plurality of apertures sized to receive a plurality of decorator tips. Once the tips are positioned within the apertures of one of the sheets. the other sheet is pivoted to the overlying position to captivate the tips between the sheets. The entire assembly is then placed into a dishwasher for cleaning.

BRIEF DESCRIPTION OF THE DRAWINGS

The features of the present invention, which are believed to be novel, are set forth with particularity in the appended claims. The invention, together with further objects and advantages thereof, may best be understood by reference to the following description taken in conjunction with the accompanying drawings in the several figures of which like reference numerals identify like elements and in which:

FIG. 1 is a perspective view of a portion of a decorator tip cleaning device constructed in accordance with the present invention;

FIG. 2 is a perspective view of a decorator tip cleaning device constructed in accordance with the present invention representing both open and closed positions;

FIG. 3 is a section view of a portion of the present invention decorator tip cleaning device;

FIG. 4 is a section view of the present invention decorator tip cleaning device taken along section lines 4-4 in FIG. 2; and FIG. 5 is a section view of a portion of the present invention decorator tip cleaning device.

DESCRIPTION OF THE PREFERRED EMBODIMENT

FIG. 1 is a perspective view of an aperture sheet 10 which, as will be set forth below, forms one-half of the present invention decorator tip cleaning device. Apertured sheet 10 comprises a linear arrangement of annular retainer rings 15, 16, 17, 18 and 19 formed as a single continuous molded unit in which the interfacing portions of retainer rings 15 through 19 are merged to form an integral structure. An integral tab 13 extends outwardly from retainer ring 15 and defines a dome shaped extension 14. A similar integral tab 11 extends outwardly from retainer ring 19 and defines an aperture 12. For reasons set forth below in greater detail, aperture 12 is sized to receive a domed extension, such as extension 14, in a relatively close tolerance fit. A second plurality of retainer rings 20, 21, 22, 23 and 24 is arranged in parallel relationship with retainer rings 15 through 19 and in similar structure thereto defines an integral linear array wherein the interfacing portion of retainer rings 20 through 24 are merged in a single integral unit. Retainer rings 20 through 24 define a plurality of apertures 30 through 34 respectively, the functions of which are set forth below in greater detail. Retainer rings 15 through 19 define a plurality of apertures 25 through 29 respectively, the functions of which are also set forth below in greater detail. A linear spacer 35 is coupled at one end to retainer ring 19 and tab 11 and at the other end to retainer rings 24. A second spacer 36 is coupled to retainer rings 17 and 18 at one end and retainer rings 22 and 23 at the other end. A third spacer 37 is similarly coupled at one end to retainer rings 16 and 17 at one end and retainer rings 21 and 22 at the other end. A fourth spacer 38 is coupled to tab 13 and retainer ring 15 at one end and retainer ring 20 at the other end. While the foregoing description of apertured sheet 10 describes the individual portions of the apertured sheet as joined or coupled units, it should be apparent to those skilled in the art that the preferred manufacture of apertured sheet 10 is that of a single sheet-like unit molded or stamped of a plastic or similar material which, for reasons set forth below in greater detail, should ideally be a material having sufficient heat resistance to be "dishwasher safe".

FIG. 2 sets forth a pictorial view of a completed assembly of a decorator tip cleaning device constructed in accordance with the present invention. It should be noted that apertured sheet 10 is positioned in essentially the same orientation as shown in FIG. 1 in that tab 13 extends to the left side of FIG. 2 and tab 11 extends to the right. In addition, and in accordance with an important aspect of the present invention, it should be understood that extension 14 in tab 13 extends in an upward direction in the assembly shown in FIG. 2. A second apertured sheet 50, identical in all respects to apertures sheet 10 shown in FIG. 1, defines a tab 53 which in turn defines a extension 54. Tab 53 and extension 54 of apertured sheet 50 correspond to tab 13 and extension 14 of apertured sheet 10. By further similarity, apertured sheet 50 defines a tab 51 and an aperture 52 corresponding to tab 11 and aperture 12 of apertured sheet 10. Apertures sheet 50 is assembled to apertured sheet 10 in an orientation in which sheet 50 is reversed from sheet 10 such that tab 51 of apertured sheet 50 overlies tab 13 of apertured sheet 10 and extension 54 of sheet 10 extends through aperture 52 of sheet 50. Similarly, tab 53 of sheet 50 overlies tab 11 of sheet 10 such that, in the closed position, extension 54 of sheet 50 extends through aperture 12 of sheet 10.

With temporary reference to FIG. 3, the details of an important aspect of the present invention structure are set forth showing the overlying positions of tab 13 of apertured sheet 10 and tab 51 of apertured sheet 50. As described above, extension 14 of apertured sheet 10 extends through aperture 52 of tab 51. In accordance with an important aspect of the present invention, and as is shown more clearly in FIG. 4, the assembly of apertured sheet 10 to apertured sheet 50 is completed by thermally deforming extension 14 to form a headed rivet-like retainer which extends beyond aperture 52 and forms a retaining head such that extension 14 is secured within aperture 52 producing a pivotal attachment between apertured sheets 10 and 50.

Returning now to FIG. 2, and with reference to the solid line depiction of apertured sheet 50 overlying apertured sheet 10, it should be noted that a plurality of generally conical or tapered shape decorator tips 60 through 69 are secured within apertured sheets 10 and 50. As mentioned above, and in accordance with an important aspect of the present invention, the extension of extension 54 of apertured sheet 50 through aperture 12 of apertured sheet 10 provides a pivotal attachment of sheets 50 and 10. The "riveting" of extension 14 permits apertured sheet 50 to be pivoted from the assembled position shown in solid depiction in FIG. 2 to the open or pivoted position in the direction of arrow 70 shown in dashed lined representation in FIG. 2. In accordance with another aspect of the present invention, extension 54 nests within aperture 12 of sheet 10 in the closed position and in cooperation with the foregoing described hinge attachment of extension 14, secures apertured sheet 50 with respect to apertured sheet 10 and by means described below in greater detail, retains decorator tips 60 through 69 in a generally parallel array corresponding to apertures 25 through 34 respectively.

FIG. 4 sets forth a section view of the present invention decorator tip cleaning device of FIG. 2 taken along section lines 4—4 therein. As mentioned above, apertured sheet 10 is positioned such that extension 14 extends upwardly and is received by aperture 52 of apertured sheet 50. Conversely, in the closed position shown in FIG. 4, extension 54 of apertured sheet 50 extends downwardly through aperture 12 of apertured sheet 10. As is also described above, a pivotal attachment between apertured sheets 10 and 50 is accomplished by thermally deforming extension 14 in a headed structure to extend beyond aperture 52 in apertured sheet 50 in an attachment which permits a pivoting in a scissor-like manner between apertured sheets 10 and 50. The situation shown in FIG. 4 is that in which a plurality of decorator tips are inserted through the apertures in sheet 10 and extend downwardly through sheet 10 such that they are supported by the interior surfaces of the apertures. For example, and as is shown in FIG. 4, tip 65 extends through aperture 25 in sheet 10 a substantial distance until the outer surface of tip 65 abutts the interior edge of aperture 25. As will be apparent to those skilled in the art, the apertures provided in apertured sheets 10 and 50 are sized to receive the various sizes of decorator tips generally encountered in the cake decorating art. For example, tip 66 is substantially smaller than tips 65 or 67. Accordingly, tip 66 is placed within a smaller aperture 26 than either apertures 25 or 27 in sheet 10. In other words, the selection of apertures sizes in sheets 10 and 50 is undertaken in anticipation of the range of sizes of decorator tips which will be retained within the decorator tip cleaning device. It should be apparent to those skilled in the art that in the event decorator tips of different sizes or shapes are utilized, a corresponding adjustment or change is made in the shapes and sizes of the apertures formed in apertured sheets 10 and 50. The important aspect being that the tapered structures of tips 65 through 69 shown in FIG. 4 causes each of the tips to extend partially but not completely through apertures 25 through 29 respectively. The aperture sizes are selected to be slightly smaller than the base of the decorator tips.

In accordance with an important aspect of the present invention as mentioned above, the protrusion of extension 54 through aperture 12 provides a nesting or snap-fit between apertured sheets 10 and 50 which inhibits further pivotal motion of the sheets with respect to each other and which secures apertured sheet 50 overlying apertured sheet 10. Because apertured sheets 50 and 10 are identical and apertures 70 through 74 in apertured sheet 50 are substantially the same diameter as apertures 25 through 29 respectively in apertured sheet 10, the portions of tips 65 through 69 extending upwardly from apertured sheet 10 can not pass through the apertures of sheet 50. As a result, the decorator tips are captivated within apertures 25 through 29 between apertured sheets 10 and 50. As a result, the assembled array of decorator tips within apertured sheets 10 and 50 are retained in a fixed secured manner which, in accordance with an important aspect of the present invention, permits the entire assembly of apertured sheets 10 and 50 as well as decorator tips 60 through 69 to be placed within a conventional automatic dishwasher and therein subjected to the effective sanitizing cleaning provided by such dishwashers. The entire assembly is placed within the dishwasher such that the pointed portion of tips 60 through 69 are pointed in the upward direction. This inverted positioning of decorator tips 60 through 69 provides a maximum of cleaning efficiency in cooperation with the cleaning mechanism of the dishwasher.

In accordance with another important aspect of the present invention, grill spaces 41, 42 and 43 between the parallel rows of apertures in sheets 10 and 50 permits the positioning of the assembly of sheets 10 and 50 and decorator tips 60 through 69 in a manner whereby the upwardly facing rungs on the top shelf of a conventional dishwasher extend through grill spaces 41 through 43 and secure the position of the assembly during the washing cycle.

FIG. 5 shows an alternate embodiment of the present invention decorator tip cleaning device which includes a pair of apertured sheets 80 and 81 each of which defines an array of apertures arranged substantially in accordance with that of sheets 10 and 50. In further similarity, apertured sheets 80 and 81 define tabs 84 and 85 respectively. While not shown in FIG. 5, it should be understood that sheets 80 and 81 also define a second set of cooperating tabs similar in construction to tabs 84 and 85. This second tab pair is located in correspondance to tabs 11 and 53 of sheets 10 and 50 and is reversed from tabs 84 and 85 in that the tab of sheet 80 defines an apertured tab identical to tab 85 and tab of sheet 81 defines a post identical to post 87 of tab 84. In short, the tab structures of the alternate embodiment of FIG. 5 are the same as those of FIGS. 1 through 4 in function and operation but differ in the means by which the two sheets are attached.

Sheets 80 and 81 are assembled such that post 87 extends through aperture 78. Thereafter, post 87 is "mushroomed" or staked to expand into chamfer 86 thereby forming a head which retains post 87 within aperture 78 and hingeably assembled sheets 80 and 81. The second set of tabs (not shown) provides the nesting function of tabs 11 and 53 of sheets 10 and 50.

The embodiment of FIG. 5 also differs from that of FIGS. 1 through 4 in the cross sectional shape of the retainer rings which receives the decorator tips (such as tip 82). The portions of sheets 80 and 81 define rounded surfaces such as surfaces 88 through 91 about apertures 77 and 83. As a result, tip 82 rests within aperture 77 of sheet 80 such that tip base 92 extends above the plane of sheet 80 and contacts curved surfaces 89 and 91 of sheet 81 which in turn captivates tip 82 within aperture 77. The advantage of the curved cross sectional structures of sheets 80 and 81 lies in the fact that sheets 80 and 81 may lie flat in the assembled position because of the clearance provided by the curved surfaces. In all other respects sheets 80 and 81 are substantially the same in structure and function to sheets 10 and 50. Accordingly, it should be understood that the discussions below directed to apertured sheets 10 and 50 apply equally well to sheets 80 and 81.

After the assembly has been subjected to the conventional rinse, wash and drying cycles of the dishwasher, the assembly is removed in similar manner to other dishes within the dishwasher and apertured sheets 10 and 50 are separated slightly permitting extension 54 to be withdrawn from aperture 12. Thereafter, apertured sheet 50 is pivoted from its assembled position overlying apertured sheet 10 and the decorator tips 60 through 69 may be removed by simply inverting the assembly and allowing tips 60 through 69 to drop from apertures 25 through 34.

As will be apparent to those skilled in the art, a number of equivalent modifications and changes to the present invention structure may be undertaken without departing from the spirit and scope of the present invention. For example, while a pivotally hinged attachment between apertured sheets has been shown as the preferred embodiment, it will be apparent to those skilled in the art that any number of fastening devices or snap fitting attachments whereby the apertured sheets are mated together in overlying position captivating the decorator tips may be utilized wihtout departing from the invention. Similarly, it will be apparent to those skilled in the art that while an arrangement which accommodates 10 decorator tips has been shown by way of example in the preferred embodiment, any number of decorator tips may be accomodated and any number of arrangements of retaining apertures may be provided in accordance with the invention. Further, it has been found to be advantageous to form the apertured sheets in a single shape in which pairs may assembled by reversing one with respect to the other. While this is the preferred form for most applications, it is anticipated that dissimilar sheets may also be used without departing from the invention. Finally, it will be apparent to those skilled in the art that while the present invention in its preferred embodiment utilizes a molded heat resistant plastic material suitable for use in a dishwasher environment, any number of other materials may be utilized without departing from the spirit and scope of the present invention.

What has been shown is a simple, inexpensive and effective means of retaining a plurality of decorator tips within a dishwasher environment whereby the decorator tips may be readily, easily and effectively cleaned without subjecting the tips to the danger of deformation or damage.

While particular embodiments of the present invention have been shown and described, it will be obvious to those skilled in the art that other changes and modifications may be made thereto without departing from the invention in its broader aspects. Therefore, the aim in the appended claims is to cover all such changes and modifications as fall within the true spirit and scope of the present invention.

What is claimed is:

1. For use in cleaning a plurality of generally tapered decorating tips, a decorator tip cleaning device comprising:

a first substantially planar member defining a first plurality of apertures;

a second substantially planar member defining a second plurality of apertures; and retaining means for removeably securing said first and second substantially planar members in an overlying relationship such that corresponding ones of said apertures within said first and second plurality of planar members are substantially aligned;

wherein said retaining means includes means pivotally securing said first and second substantially planar members such that said first and second members are pivotally moveable between a first overlying position and a second offset position; and nesting means causing said first and second members to be snap-fitted together in said first overlying position; and a first tab extending outwardly from said first substantially planar member defining a first aperture; and a second tab extending outwardly from said second substantially planar member defining a first extension, said first extension extending through said first aperture and terminating in a head securing said first and second substantially planar members in a pivotal attachment.

2. A decorator tip cleaning device as set forth in claim 1 wherein said nesting means includes;

a third tab extending outwardly from said second substantially planar member defining a second aperture; and a fourth tab extending outwardly from said first substantially planar member defining a second extension, said second extension extending through said second aperture in said first overlying position securing said first and second substantially planar members in said first position and inhibiting pivotal motion of said planar members.

3. A decorator tip cleaning device as set forth in claim 2 wherein said first and second planar members comprise substantially identical structures and wherein said first planar member is assembled to said second planar member in a reverse orientation with respect thereto.

4. A decorator tip cleaning device as set forth in claim 3 wherein said first and said second pluralities of apertures define inwardly facing curved surfaces.

5. A decorator tip cleaning device as set forth in claim 3 wherein said first aperture in said first tab defines a chamfered surface and wherein said first extension defines a substantially cylindrical post, said terminating head of said first extension being formed by mushrooming said first extension to expand into a portion of said chamfer.

6. A decorator tip cleaning device, for use in cleaning a plurality of decorator tips, having a pair of planar sheets of heat resistant plastic material hinged together and moveable with respect to each other between an overlying position and an open position, said sheets each defining a plurality of apertures sized to receive a plurality of decorator tips once the tips are positioned within the apertures of one of the sheets such that the other sheet may be pivoted to the overlying position to captivate the tips between the sheets.

7. A decorator tip cleaning device as set forth in claim 6 wherein said sheets of said pair of planar sheets are of identical construction and are combined by reversing the sheets before being hinged together.

* * * * *